June 23, 1931. J. J. JAKOSKY 1,811,547
METHOD AND APPARATUS FOR LOCATING UNKNOWN CONDUCTIVE BODIES
Filed June 19, 1928 6 Sheets-Sheet 1
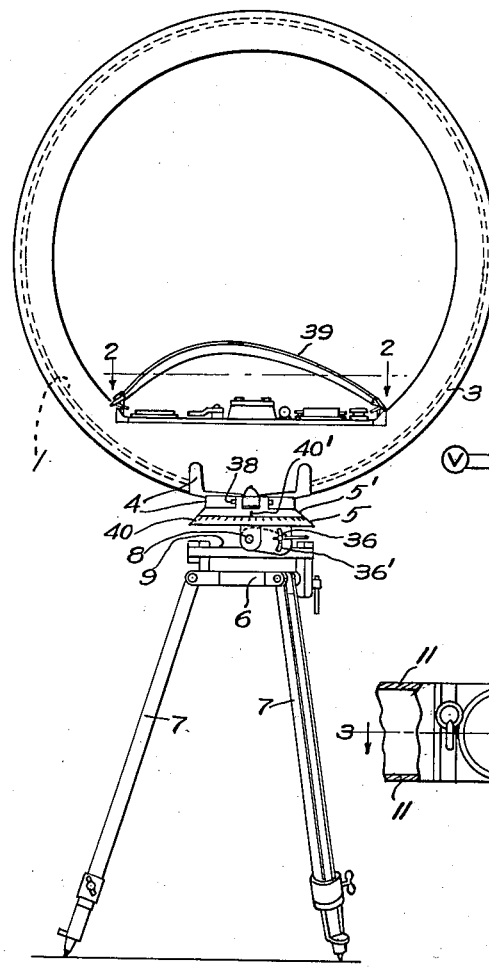
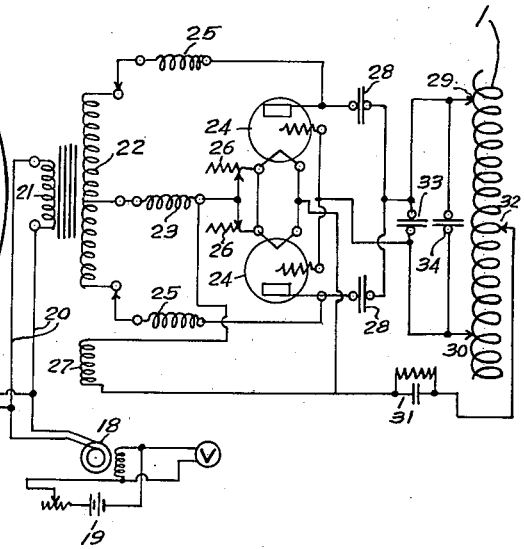
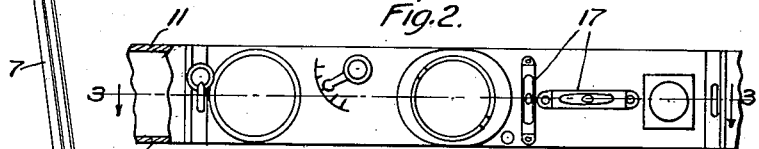
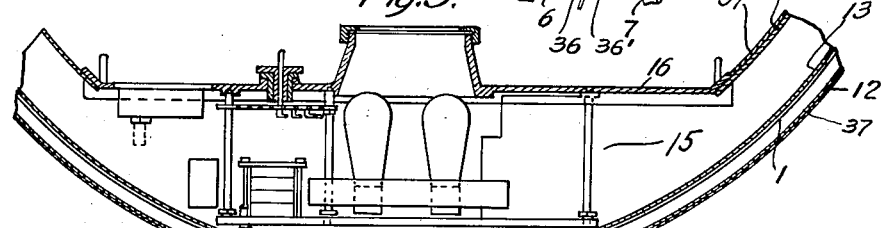
INVENTOR.
John J. Jakosky,
BY
ATTORNEYS

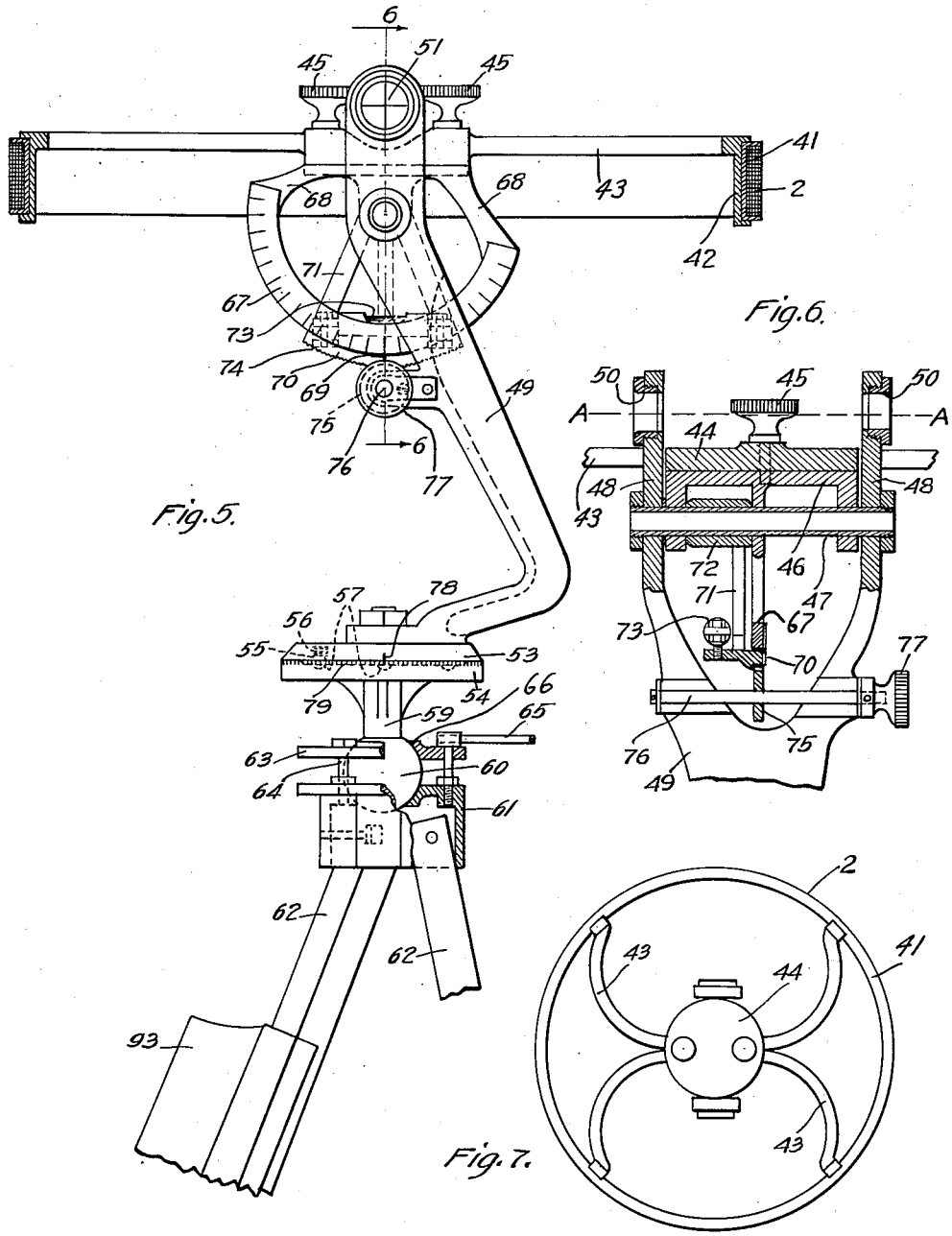

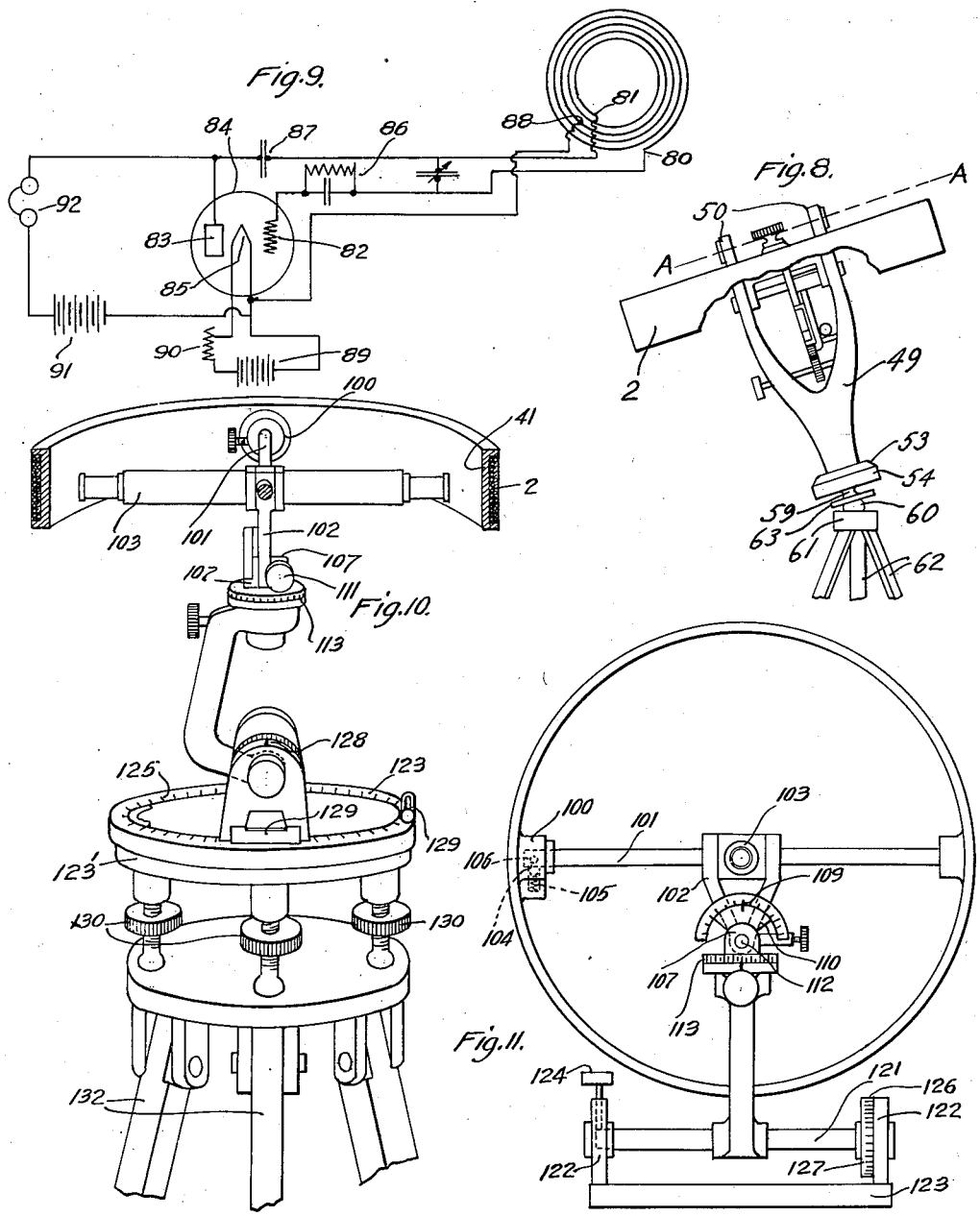

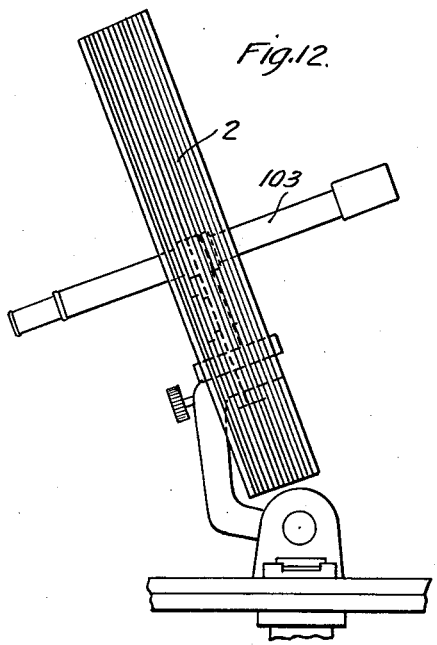
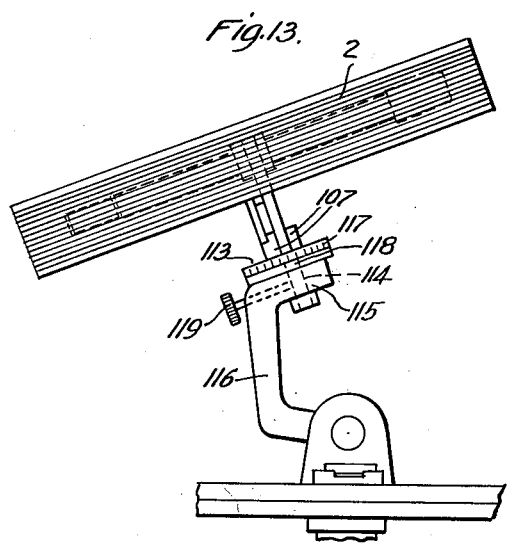
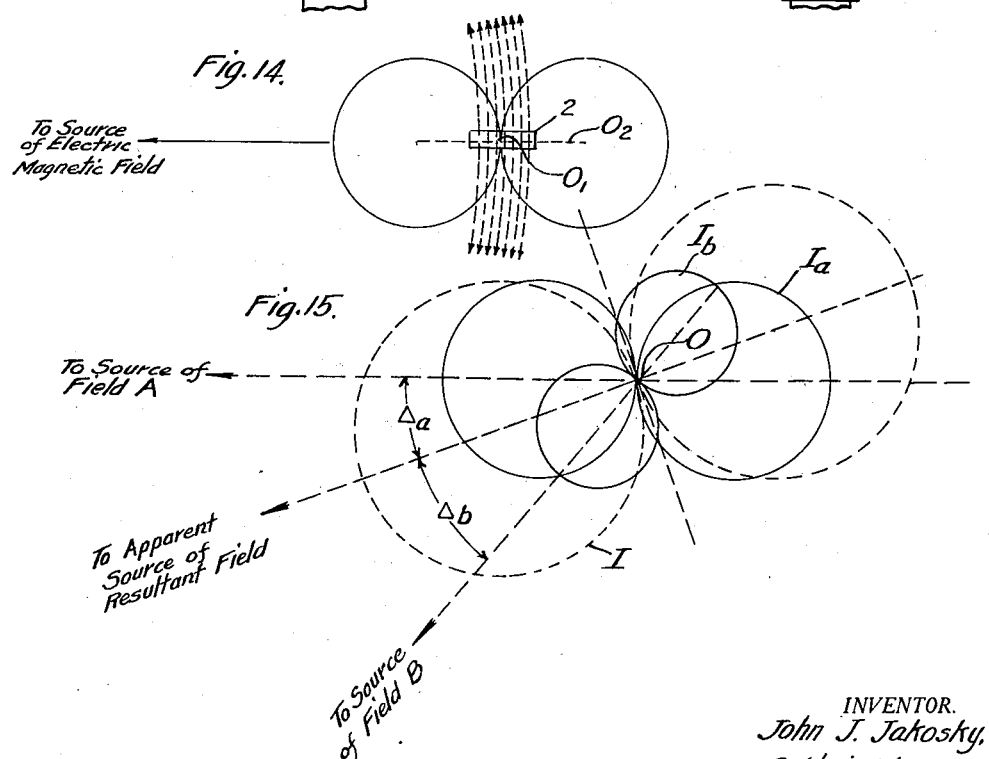

June 23, 1931. J. J. JAKOSKY 1,811,547
METHOD AND APPARATUS FOR LOCATING UNKNOWN CONDUCTIVE BODIES
Filed June 19, 1928 6 Sheets-Sheet 5

INVENTOR.
John J. Jakosky,
BY Arthur P. Knight and
Alfred W. Knight
ATTORNEYS

Patented June 23, 1931

1,811,547

UNITED STATES PATENT OFFICE

JOHN J. JAKOSKY, OF LOS ANGELES, CALIFORNIA, ASSIGNOR TO THE RADIORE COMPANY, OF LOS ANGELES, CALIFORNIA, A CORPORATION OF CALIFORNIA

METHOD AND APPARATUS FOR LOCATING UNKNOWN CONDUCTIVE BODIES

Application filed June 19, 1928. Serial No. 286,557.

This invention relates to the location of ore bodies, pipe lines or other bodies of relatively good electrical conductivity, within the earth's crust or any mass of relatively poor conductivity, and particularly to the location of such bodies by methods commonly known as "inductive methods", this term being used to indicate that the current flow in the conductive body which gives rise to the indications utilized in determining the location of such body is caused to flow by induction, rather than conduction, as in certain other methods for similar purposes.

According to the inductive method for locating such bodies, a high frequency electromagnetic field (called the primary or energizing field) is established in the region to be explored, which results in setting up an alternating electric current in any conductive body within such region and so disposed as to be cut by the lines of force of such field, said alternating current being of a frequency equal to that of the primary field, and said alternating current causing a secondary electromagnetic field of the same frequency to be set up, the axis of said secondary field being the axis of the current flow in the conductive body; and the resultant effects of the primary and secondary electromagnetic fields throughout such region are determined by means of a direction-finding coil receiver, indications as to the presence of any secondary field and the direction of the lines of force thereof being obtained by rotating the direction-finding coil about a suitable axis and noting the resulting variation in intensity of the signal received thereby, and the position of the unknown conductive body is calculated or plotted by means of such indications.

The principal object of this invention is to obtain indications which indicate more accurately the presence and correct location of an unknown conductive body than the methods heretofore employed.

A particular object of the invention is to eliminate or minimize the errors due to distortion of the primary field.

It has already been proposed to use a transmitting or energizing loop as the source of the primary electromagnetic field and to note the presence and directional effect of any secondary field by setting up a direction-finding coil at a suitable distance from the energizing loop and rotating such coil about a horizontal axis lying in the vertical plane of the energizing loop and noting the position of the direction-finding coil about such axis at which maximum or minimum signal reception is obtained. In some cases indications have also been obtained by rotating the coil about a vertical axis. I have found, however, that while the above described method operates very satisfactorily in level or smooth country, it sometimes leads to erroneous results in hilly or mountainous country. The incorrect indications obtained under such conditions are apparently due to distortion of the primary field adjacent the surface of the earth because of the slope or irregularity of the surface, by reason of which the lines of force of the primary field are not exactly horizontal at the position of the direction-finding coil and furthermore, the horizontal projections of such lines of force are not exactly perpendicular to the direction from the direction-finding coil toward the energizing loop.

I have further found that under conditions of distortion of the primary field as, for example, in hilly or mountainous country, when the energizing loop and the direction-finding coil are not at the same level, more accurate indications, and particularly more accurate indications of the presence and directional effect of the secondary field and hence of the location and depth of the unknown conductor producing such secondary field, can be obtained by rotating the direction-finding coil about an axis extending in the actual or true direction from said coil toward the energizing loop rather than about a horizontal axis extending in the vertical plane of said loop; and also, if desired, advantageous results may be secured by rotating the direction-finding coil about an axis perpendicular to said first-named axis and lying in the same vertical plane, rather than by rotating said coil about a vertical axis, and such rotation of the coil about such axes constitutes the essential feature of the method of this invention.

The invention also comprises a novel principle of construction of the direction-finding coil apparatus, which is particularly advantageous for carrying out the above method, the essential features of such apparatus being that it provides for convenient and rapid alignment thereof with reference to the true direction toward the energizing loop, and when so aligned, permits rotation of the coil about an axis extending in such direction and measurement of the angular position of such coil about said axis, with respect to the vertical. If desired, the apparatus may also be constructed so as to permit rotation of the coil about an axis perpendicular to the first-named axis of rotation and lying in the same vertical plane, and measurement of the angular position of the coil about said last-named axis.

The invention also comprises a novel form of energizing apparatus for use in such methods of electrical prospecting.

The accompanying drawings illustrate the apparatus and method of my invention and referring thereto:

Fig. 1 is a side elevation of a form of transmitting or energizing apparatus which may be used in connection therewith.

Fig. 1a is a partial view from the right in Fig. 1.

Fig. 2 is a partial plan view taken on line 2—2 in Fig. 1.

Fig. 3 is a vertical section on line 3—3 in Fig. 2.

Fig. 4 is a wiring diagram of the electric circuit of said energizing apparatus.

Fig. 5 is a front elevation of one form of direction-finding apparatus of my invention, with the coil shown in section.

Fig. 6 is a vertical section on line 6—6 in Fig. 5.

Fig. 7 is a plan view of the coil and mounting means therefor.

Fig. 8 is a side elevation of the direction-finding apparatus adjusted with the axis of rotation in an inclined direction toward the energizing loop.

Fig. 9 is a wiring diagram of a suitable form of electric circuit for said direction-finding apparatus.

Fig. 10 is a perspective side view of another form of direction-finding apparatus, with the coil shown in section.

Fig. 11 is a front elevation of the upper part of the apparatus shown in Fig. 10.

Fig. 12 is a side elevation of the upper part of the direction-finding apparatus shown in Figs. 10 and 11, with the coil in position for rotation about an axis perpendicular to the direction toward the energizing loop.

Fig. 13 is a similar view with the coil in position for rotation about an axis extending in the direction toward the energizing loop.

Fig. 14 shows a characteristic figure-eight curve representing the current induced in a direction-finding coil by an electromagnetic field.

Fig. 15 is a diagrammatic representation of the resultant current induced in a receiving coil by two component fields.

Figure 18:
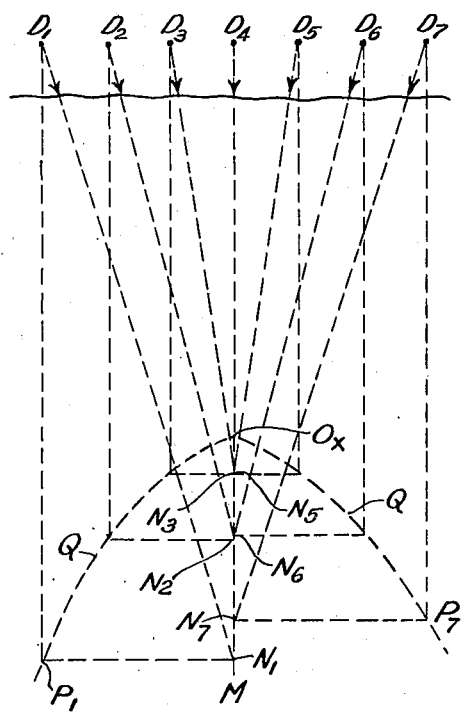
Fig. 18 is a diagrammatic representation, upon a plane similar to Fig. 17, of a series of indications obtained as shown in said figure, and of the method of plotting such indications to locate the axis of a conductor.
Figure 19:
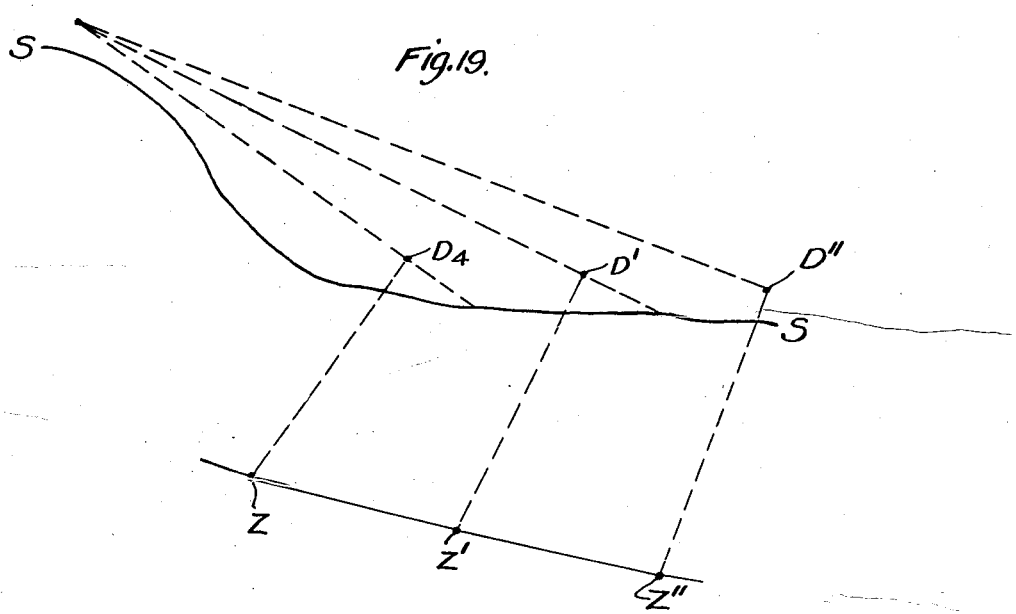

Fig. 19 indicates the inclination of successive planes in which readings at different distances from the energizing loop are plotted as shown in Fig. 18, and the method of plotting the profile of the axis of the conductor.

Figure 16:
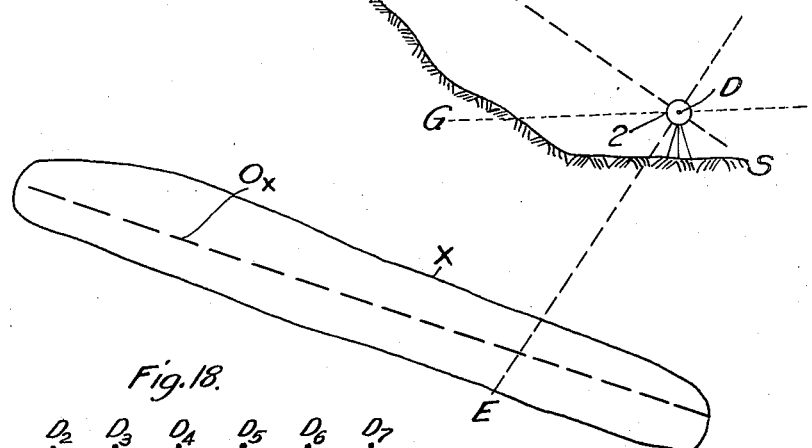
Fig. 16 is a diagrammatic representation upon a vertical plane of a typical relation between the positions of the energizing loop and direction-finding coil, showing the two axes about which such coil is rotated according to this invention.
Figure 20:
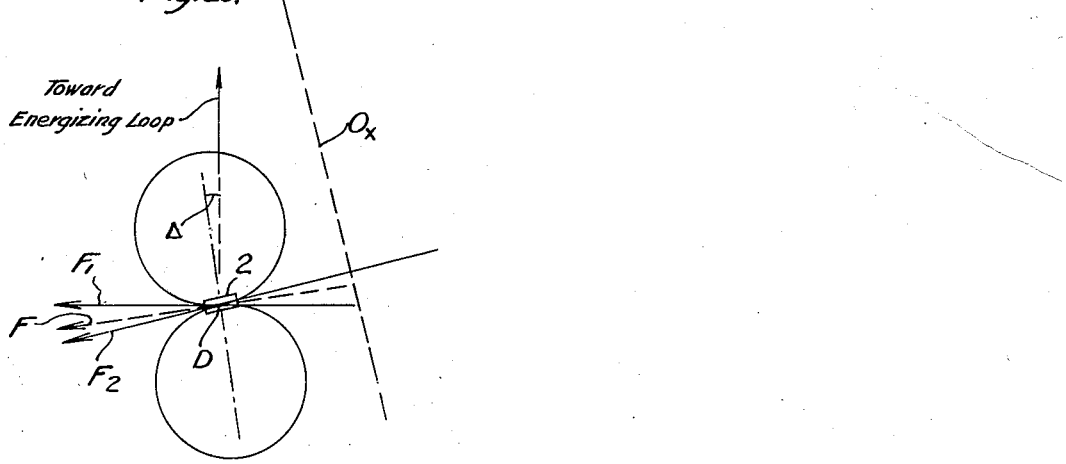

Fig. 20 is a diagrammatic representation, upon a plane perpendicular to the plane of Fig. 16 and including the line from the direction-finding coil to the energizing loop, showing the type of indications obtained upon rotation of the direction-finding coil about an axis perpendicular to the plane of the figure.

A novel form of energizing loop and mounting means therefor, which forms a part of my invention, is illustrated in Figs. 1 to 3 inclusive and one example of an electric circuit therefor is shown in Fig. 4.

A ring-shaped frame 3 of wood, bakelite or other suitable insulating material, is secured to bracket 4, which is mounted on turn-table 5 for rotation about a vertical axis. Said turn-table may be mounted upon the head 6 of tripod 7 so as to permit levelling thereof. For this purpose turntable 5 may be mounted by pin 8 on bracket 9 for rotation about one horizontal axis, while said bracket may in turn be mounted by pin 10 on tripod head 6, for rotation about another axis perpendicular to the first. Clamping screws 36, passing through arc-shaped slots 36′, may be provided for clamping the turn-table in any position to which it may be adjusted about either of the pins 8 or 10. The frame 3 consists of side members 11, an outer wall 12, intermediate wall 13, and inner wall 14. The transmitting loop 1 may consist of a suitable number of turns of wire wound upon the intermediate wall 13, a space being preferably provided between said wire and the outer wall 12, as shown, so that even if the outer wall should become damp, as might happen with a wooden frame if used in wet weather, the loop will not become shorted from one turn to another. The walls of frame 3 are secured together in such manner as to provide a substantially water-tight housing for the loop. The entire frame 3 is preferably covered with a layer of waterproof tape or other waterproof covering as indicated at 37. The inner wall 14 may be omitted at the lower portion of the frame, to provide a space 15 for mounting the tubes, condensers, transformer, and other parts of the energizing circuit, such parts being mounted upon a supporting plate 16 which may be secured to and form a part of the frame. Level bubble means 17 may be mounted on the top of plate 16.

For convenience in carrying the apparatus, it is preferably so constructed that the tripod legs may be folded up alongside the loop. For this purpose, the bracket 4 may be hingedly mounted, as at 38, on an upper turn-table plate 5', while clamping bolt 38' may be provided for ordinarily holding the parts in the position shown. By loosening said bolt, however, the tripod and all parts of the mounting, up to and including lower turn-table plate 5, may be swung upwardly about hinge 38 to a position alongside the loop. The entire apparatus may be carried on the shoulder of the operator or assistant, the carrying strap 39 being preferably provided for this purpose. The lower turn-table plate 5 may be provided with an angular scale 40, and upper turn-table plate with marks 40' for indicating angular rotation of the loop about a vertical axis. There may advantageously be four of the marks 40', at intervals of 90°, so that the loop may be readily turned to a position exactly 90° from a former position.

Any suitable form of energizing circuit may be used for producing the necessary high frequency oscillations in loop 1, one form of such circuit being indicated diagrammatically in Fig. 4. The circuit shown comprises an alternator 18 which may be hand-driven or power driven, and which is excited by current supplied by battery 19. The output of said alternator may be connected by wires 20 to a transformer primary winding 21. The alternator may be adapted to deliver to said transformer alternating current of any suitable relatively low frequency, such as 500 cycles.

The center of the secondary winding 22 of said transformer is connected through choke coil 23 to the filaments of thermionic tubes 24, each of which comprises in addition to said filaments, the usual plate and grid means of the ordinary three-electrode thermionic tube. The ends of the secondary winding of said transformer are connected through choke coils 25 to the plates of the respective thermionic tubes. The filaments of both tubes may be connected through adjustable resistance means 26 to a separate secondary winding 27 of the transformer adapted to supply current for heating such filaments. The plates of said tubes may be connected through plate stopping condensers 28 to one of the end connections 29 of the loop 1, while the grids may be connected to the other end connection 30 of said loop. A connection is also provided from the filaments through grid leak and condenser 31 to the intermediate connection 32 of the loop. Means are preferably provided whereby the connections 29, 30 and 32 may be adjusted on the loop so as to include any desired number of turns of wire between these respective connections. Tuning of the loop circuit to give the desired frequency of oscillation may thus be accomplished partly by varying the inductance of the loop and partly by means of loading condenser 33 and variable tuning condenser 34 which are connected as shown between the end connections of the loop.

The essential elements of the oscillating circuit and particularly the tubes, transformer, choke coils, condensers, and all parts requiring adjustment during operation may, as above stated, be advantageously mounted within the space 15 at the lower portion of the loop supporting frame 3. It will be understood, however, that the alternator and the exciting battery therefor, are preferably housed separately, in order to not unduly increase the weight of the energizing apparatus.

While I have described one particular type of circuit for producing high frequency current in the transmitting loop it will be understood that any other suitable means may be employed for this purpose.

For the purpose of determining the presence and the direction of any secondary electro-magnetic field in the area being explored and hence determining the location of underground conductors beneath such area, I prefer to employ a direction-finding apparatus comprising a coil or loop antenna mounted upon a tripod or other supporting means and provided with means for leveling or orienting the same, and said coil being so mounted as to permit rotation thereof about an axis whose direction and inclination may be readily adjusted, so that said axis may be directed toward the energizing apparatus even though said energizing loop is considerably higher or lower than the direction-finding apparatus.

Such apparatus may comprise, for example, as shown in Figs. 5 to 8, a wire coil 2 of sufficient turns and dimensions to efficiently intercept, in combination with the tuning means hereinafter described, a sufficient amount of energy from the electromagnetic field produced by the transmitting loop or by the unknown conductor, or both, for the purposes of detection and accurate indication of directions. The coil is wound upon a supporting ring 41 of wood, bakelite or other suitable material of low conductivity, and the coil unit thus provided may be mounted in brackets 42 at the ends of arms 43 extending outwardly from a central supporting plate 44. Plate 44 may be secured by means of bolts 45 to a bearing member 46 which is rotatably mounted on shaft 47 secured to the arms 48 of supporting yoke 49. At the upper ends of said arms are provided sighting devices 50 having crosswires 51 or other devices which may be aligned by sight, the intersections of said crosswires, or other points of alignment being disposed upon a line of sight indicated in dotted lines at A—A in Fig. 6, which is parallel to the axis of shaft 47.

Yoke 49 is secured to a ring or plate 53 which is rotatable, about an axis perpendicular to the line of sight A—A, with respect to a lower ring or plate 54. Plate 53 is provided with a ball or other catch member 55 pressed downwardly by spring 56 and adapted to engage in any one of four recesses 57 in plate 54, said recesses being spaced 90° apart. Plate 53 may be provided with a mark 78 cooperating with an angular scale 79 on plate 54 for indicating the angular position of the coil about the last-mentioned axis of rotation. Plate 54 is provided with a downwardly projecting arm 59 at the lower end of which is provided a ball 60. Said ball is held between a lower clamping plate 61, mounted at the upper ends of three tripod legs 62, and an upper clamping plate 63. Arm 59 extends through an opening 66 in the upper clamping plate 63, and said opening is of such size, in proportion to the diameter of arm 59, to permit movement of said arm about the center of ball 60 through quite a large angle, preferably an angle of about 30°, or, in some cases, 45°, in any direction from the vertical. Three bolts 64 are provided for clamping ball 60 between said plates, and one or more of said bolts may be provided with a handle 65 whereby the same may be loosened sufficiently to permit free movement of said ball between the plates. This construction permits universal motion of the supporting head comprising yoke 49 and plates 53 and 54 with respect to a supporting base comprising plate 61 and tripod 62, so that said tripod may be set up, and then by loosening the upper clamping plate 63, the supporting head may be moved in any direction about ball 60 as a center, so as to permit alignment of the sighting devices 50 on the desired line of sight as hereinafter described. Handle 65 is then operated to clamp the supporting head in this position.

In order to measure the angular position of coil 2 about its axis of rotation, with respect to a vertical plane passing through said axis, an angle measuring scale 67 is mounted upon bearing member 46 as by means of arms 68. Said scale cooperates with a mark 69 on segment 70 which is independently rotatable about shaft 47, being supported, for example, by means of arms 71 secured to a hub portion 72 rotatably mounted on said shaft. Segment 70 is provided with a level bubble device 73 which is visible from the front of the apparatus between arms 71. In order to adjust mark 69 to the vertical plane of reference, the lower edge of segment 70 may be provided with gear teeth 74, and a pinion 75 may be provided engaging said gear teeth, said pinion being mounted on shaft 76 having a handle or knob 77 for turning said pinion and hence adjusting segment 70 to bring said mark to the desired position as indicated by the level device 73.

One form of receiving circuit for the direction-finding apparatus is illustrated in Fig. 9. The two terminals 80 and 81 of coil 2 are connected respectively to the grid 82 and plate 83 of a thermionic tube detecting device 84 which is also provided with the usual filament 85. The connection between terminal 80 and grid 82 includes grid condenser and grid-leak 86 while the connection between the terminal 81 and plate 83 includes plate condenser 87. The terminal 88 which is located at approximately the middle of the winding of coil 2 is connected to one terminal of filament 85. Suitable means such as battery 89 may be provided for supplying electric current for heating the filament 85 and a rheostat 90 may be provided for regulating such current supply. A suitable source of direct current supply such as battery 91 may be connected to the plate circuit of tube 84, said battery being adapted to deliver current at a voltage corresponding to the characteristics of said tube. A suitable electric current indicating device such as a pair of telephone receivers indicated at 92 is also connected in series with battery 91. The circuit just described constitutes a so-called oscillating detector circuit well-known in the art of radio communication and it will be understood that any suitable detecting and amplifying circuit or means may be employed for detecting and amplifying and measuring the current received by coil 2, in the place of that shown and described. The various parts of the circuit shown in Fig. 9 may conveniently be mounted in a suitable casing 93 which may be suspended on the tripod 62 as shown in Fig. 5.

Another form of direction-finding apparatus is shown in Figs. 10 to 13 inclusive, in which means are provided for rotating the coil and measuring the angular position thereof not only about an axis extending in the true direction toward the energizing loop, but also about an axis perpendicular to such first axis and lying in the same vertical plane. In this case the ring 41 on which the coil 2 is wound, is shown as provided with bearing means 100 whereby the same is rotatably mounted at the ends of rod or shaft 101. The rod 101 may be rigidly secured to a supporting yoke 102, upon which is also rigidly mounted a telescope or sighting device 103. The coil may be swung about shaft 101 either to the relative position shown in Figs. 10 and 13, in which the plane of the coil is parallel to the axis of telescope 103, or to the relative position shown in Figs. 11 and 12 in which the plane of the coil is perpendicular to the axis of said telescope. A ball 104, pressed inwardly by spring 105, may be provided engaging in either of two small recesses 106 to hold the coil in either of said two positions.

The supporting yoke 102 is pivotally mounted by means of shaft 112 between lugs 107, so as to rotate about an axis parallel to the axis of sighting device 103. A measuring arc 108 may be secured to yoke 102 so as to cooperate with indicating means 109 on plate 110 secured to one of the lugs 107, to indicate the angular position of the coil about said axis. Set screw 111 may be provided for holding yoke 102 and the coil in any position about this axis of rotation.

A circular plate 113 and downwardly extending shaft 114 are secured to or formed integrally with the supporting lugs 107, said shaft being rotatably mounted in bearing 115 at the upper end of the supporting arm 116, and said plate 113 being provided with an angle measuring scale 117 co-operating with a mark 118 on bearing means 115 to indicate the angular position of the coil with respect to rotation about shaft 114. Set screw 119 is provided for clamping said shaft in any desired position. In order to permit arm 116 to be swung vertically for alignment of the sighting device 103 in the true direction toward the energizing loop, said arm may be mounted upon shaft 121 rotatably mounted in bearing lugs 122 on base plate 123. Set screw 124 is provided for holding shaft 121 in any desired position, and the vertical angular position or inclination of the sighting device may be indicated by scale means 126 on a plate 127 secured to shaft 121, said scale means cooperating with a mark 128 on one of the lugs 122. Base plate 123 may be rotatably mounted upon a sub-base 123' and may be provided with scale means 125, with level indicating devices 129, and with leveling screws 130 similar to those in the ordinary surveyor's transit. The entire device may be mounted upon a supporting tripod indicated at 132.

Any suitable form of receiving circuit, for example, that shown in Fig. 9, may also be employed with this form of direction-finding apparatus.

For the purpose of clearly outlining the laws governing the action of a coil used for direction-finding purposes, reference is made to Fig. 14 which shows the characteristic curve of the intensity of current induced in a receiving coil, such as coil 2, by a single electromagnetic field whose source is in the direction indicated, as the coil is rotated through 360° about an axis $O_1$ perpendicular to a plane embracing the source of the field and the direction of the magnetic lines of force at the position of the coil. The direction of the magnetic lines of force is indicated by the curved arrows. It is well known to those versed in the art that for the condition of maximum current induction, and hence of maximum signal intensity, the plane of the coil extends in the position shown, namely, in a direction toward the source of the electromagnetic field, while for any other position of the coil the current induction follows the figure-of-eight curve shown. This is due of course to a variation in the total flux through the coil, the position of maximum signal intensity being that at which such flux is a maximum. If, on the other hand, the coil be turned to the position shown and then rotated about an axis $O_2$ perpendicular to the axis $O_1$ and extending toward the source of the field, it will be found that as the position of the coil deviates from the position perpendicular to the magnetic lines of force of the field, the current intensity also decreases and follows a similar figure-of-eight. The coil, therefore, when rotated about an axis pointed toward the source of the field indicates by its position at the time of maximum signal intensity the direction of the magnetic lines of force of the field, at the coil. If, for example, the field is vertically polarized, or if the lines of magnetic force are horizontal or tangent to the horizontal at the position of the coil, Fig. 14 may be considered as a plan view, and the coil indicates by its position at the time of maximum signal intensity not only such direction of polarization or the direction of the lines of magnetic force, but also the direction toward the source of the field. If the lines of magnetic force were not tangent to the horizontal at the position of the coil, indicating an apparent nonvertical polarization of the field, then rotation of the coil about a horizontal axis pointing toward the source of the field would give a maximum current induction when the plane of the coil extended in a direction perpendicular to the magnetic lines of force and would thus indicate the direction of such lines of force at the coil. It will be seen, therefore, that a coil receiver may be used to indicate both the direction from the coil toward the source of the field and also the direction of the lines of force of the field at the coil.

It may be noted here that, in actual practice, it is customary, instead of directly determining the position of the coil for maximum current induction, to note the direction indicated by the position of minimum current induction (minimum signal intensity), and then take as a direction of maximum a direction which under ideal conditions is perpendicular to the minimum. This is for the reason that the minimums are generally much sharper than the maximums, and more accurate results are thus obtained. Without the presence of the so-called "antenna effect" the minimums will occur 180° apart and hence the indicated direction toward the axis of the field will be 90° to either minimum. The antenna effect, however, often tends to make the minimums broad instead of sharp and also tends to cause the minimums to occur other than 180° apart (less than 180° in one direction and greater in the other). In determining the direction of electro-magnetic fields for the purpose of this invention, it is highly essential that such "antenna effect" be recognized and compensated for, or eliminated or reduced as far as possible, and for this purpose care must be exercised in the design of the coil and its auxiliary apparatus. This antenna effect, together with its influence in broadening or displacing the minimum readings obtained by a coil, and methods of eliminating it, are outlined in Bureau of Standards Scientific Paper No. 428, pages 541 to 544. While that paper deals particularly with the antenna effect when a single field is imposed upon the coil, it has been found that the methods of elimination of antenna effect therein outlined also give satisfactory results when two or more fields are imposed on the coil, as by the method of the present invention and these or other methods of prevention should therefore be followed in all cases in order to secure the most accurate results.

In Fig. 15 is represented the curve of resultant current induced in a coil by two electromagnetic fields A and B, which are in phase with one another and are identically polarized or whose magnetic lines of force either lie in or are tangent to the same plane perpendicular to the axis of the coil at O, but whose sources are at different directions from the coil. In this figure, $I_a$ represents the current curve which would be produced by the field A, and $I_b$ that which would be produced by the field B. The resultant current curve, for a condition when the fields are of identical frequency and when the currents induced thereby in the coil are in phase, is shown in dotted lines at I, and indicates as shown, the direction toward the apparent source of an imaginary field which would produce the same effect upon the coil. The angles of apparent distortion in the direction of the respective fields due to the effect of the other field, are indicated at $\Delta a$ and $\Delta b$. A difference in direction of lines of force of the two fields at the position of the coil, due to a difference in polarization thereof, would have a similar effect upon the current curve obtained upon rotation of the coil about an appropriate axis. It may therefore be seen that if a plurality of readings be taken with a coil in a region in which such coil is subject to the action of two electromagnetic fields whose sources lie at different directions from the coil and whose magnetic lines of force extend in different directions, then if the direction toward the source of one of the fields and the direction of its magnetic lines of force are known, the location of the axis of the other field may be calculated. It will be understood that in the actual cases usually encountered in the location of underground conductive bodies the direction of the lines of force of the primary field and of the secondary field at the point of measurement are not generally such as to correspond to fields of identical polarization so that the problem is somewhat more involved than the simple case above outlined, but nevertheless such a problem may be readily solved by the procedure hereinafter outlined.

It is also evident from Fig. 15 that the apparent direction indicated by the resultant current curve obtained with a coil is dependent not only upon the directions of the two fields, but also upon the relative intensities thereof at the position of the coil. In said figure, for example, such apparent direction is nearer to that of the larger field A whose current curve is shown at $I_a$, than to that of the smaller field B. In other words, the apparent distortion in direction $\Delta a$ of the larger field is less than the apparent distortion in direction $\Delta b$ of the smaller field. In order, therefore, to obtain the most accurate indications of the direction of the secondary field surrounding an unknown conductor, it is necessary that the strength of such secondary field at the point of observation be as great as possible as compared with the primary or energizing field used to induce the flow of current in such conductor. For this reason it is preferable to employ a loop transmitter, for example such as above described, and to maintain the plane of the loop vertical, and in making the final or most accurate survey, to place the loop in a position substantially over the approximate location of the conductor, in such manner that a maximum current induction in the unknown conductor is obtained, accompanied by a maximum relative strength of secondary field surrounding the same.

For the same reason, it is desirable to make observations with the direction-finding coil at distances from the energizing loop, along the length of the conductor, which are relatively great as compared to the depth of the conductor, because the strength of primary fields decreases much more rapidly with such distance than does that of the secondary field, because the current induced in the unknown conductor directly below the energizing loop will travel for great distances along said conductor, and will create a secondary field throughout the length of such travel. So far as the secondary field is concerned, therefore, the receiving coil is affected to substantially the same extent as though it were above the same portion of the conducting body as is the transmitting loop, but it is much less affected by the primary field, due to the distance through which such primary field travels before reaching the receiving coil. As is well known, the strength of the induction component of an electromagnetic field varies inversely as the square of the distance from the source, while the radiation component varies inversely as the distance. Since at the short distances ordinarily involved in the practice of this method, the induction component constitutes the major portion of the total field, it will be seen that the effect of distance upon intensity of the field is quite important.

I will now proceed to describe the method of obtaining indications as to the position of an ore body or other underground conductor, according to my invention. In Fig. 16 is illustrated a type of condition which is encountered in electrical prospecting in hilly or mountainous country, in which the energizing loop 1 is located with its center at a point C, while the direction-finding coil 2 is located with its center at point D, which is materially lower (or higher) than C. The profile of the earth's surface is indicated at S—S. I have found that under such conditions, and particularly when the intervening surface of the land slopes not only in a direction from C to D but also transversely to said direction, the primary field is often greatly distorted from its normal position, so that the lines of magnetic force thereof are not horizontal at the position of the direction-finding coil, even though the energizing loop is turned so that the vertical plane thereof passes through the direction-finding coil. If, as has heretofore been customary, the direction-finding coil is rotated, for the purpose of observing variation in intensity of signal reception thereby, about a horizontal axis lying substantially in the vertical plane of the energizing loop, as indicated in light dotted lines at DG, the effect of this distortion of the primary field is such as to give erroneous indications as to the occurrence or location of underground conductors, due to the coil assuming, in the presence of the primary field alone, a position other than vertical for maximum signal intensity (or horizontal for minimum signal intensity).

According to this invention, therefore, the indications of principal importance are obtained by rotating the direction-finding coil about an axis lying along, or parallel to, the line CD, and I have found that the errors introduced by distortion of the primary field are much less in this case than in the former case. In the presence of the primary field alone, the direction-finding coil will more consistently give maximum readings in a vertical position (or minimum readings in a horizontal position) or at least the departure thereof from either of these two positions will be minimized.

If, however, there is an underground conductor, such as an ore body X (Figs. 16 and 17), whose electrical axis is at $O_x$, the coil 2 will also be influenced by the secondary electromagnetic field surrounding said axis due to the current induced in said conductor by the energizing field, and if the projections of the lines of magnetic force of such secondary field upon the plane perpendicular to the axis of rotation of the direction-finding coil are other than horizontal, the coil will indicate a position other than vertical for maximum signal intensity (or horizontal for minimum signal intensity).

Figure 17:
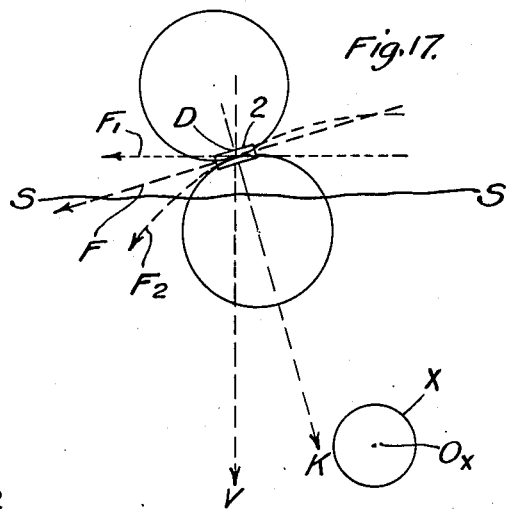
Fig. 17 is a diagrammatic representation, upon a plane perpendicular to the line extending from the direction-finding coil toward the energizing loop, showing the type of indications obtained upon rotation of said coil about said line as an axis.

If, for example, as shown in Fig. 17, the axis $O_x$ lies to the right of the point D, the direction of the lines of force of the primary or energizing field being indicated at $F_1$ and of the secondary field at $F_2$, the coil will give a minimum signal intensity at the position shown, corresponding to an imaginary resultant field, the apparent direction of whose lines of force is indicated at F. In other words, the position of the coil for maximum signal intensity is shifted from the vertical direction DV to the direction DK, and the direction of such shifting of position indicates that there is an underground conductor somewhere to the right of point D. The readings of the position of the coil thus obtained are commonly known as "dip" readings, the magnitude of the "dip", as measured either from the vertical DV or from the horizontal, indicating the direction of the line DK. It should be borne in mind that, since the rotation of the coil is about an inclined axis parallel to CD, the indications represented in Fig. 17 are not in a vertical plane, but rather in a plane perpendicular to such axis. The direction of such plane with respect to the vertical is indicated by the line D E in Fig. 16.

If a series of "dip" readings as above described are made at a plurality of suitably spaced points along a horizontal traverse perpendicular to the line CD, and if this is repeated at different distances from the energizing loop and for different positions of the energizing loop, the presence and location of underground conductors may be determined. A group of "dip" readings such as indicated, for example, at $D_1$ to $D_7$ in Fig. 18, that is, a vertical "dip" with converging "dips" at both sides thereof, indicates that the conductor is beneath the vertical "dip" position $D_4$.

In actual operations, I prefer to conduct two sets of readings or surveys. In the first, or "reconnaissance" survey, the energizing loop is set up successively at a plurality of arbitrarily selected points spaced at suitable intervals throughout the area to be studied, and for each such set-up of the loop, a whole series of readings are made with the direction-finding coil at a plurality of points along a series of traverses at different distances from the energizing loop. For making each of these readings, the energizing loop is kept in a vertical plane and is directed in each case toward the position of the direction-finding coil. The direction-finding coil is set up and aligned with its axis of rotation in the true direction toward the center of the energizing loop, and is then rotated about this axis, and the resulting variations in signal intensity are observed, preferably by determining the position of minimum reception. The "dip" reading is then observed.

Using the form of direction-finding apparatus shown in Figs. 5 to 8 inclusive, this is accomplished by setting up the apparatus and adjusting the tripod legs 62 so as to bring the plate 61 to a position roughly approximating the horizontal, then loosening handle 65 and adjusting the entire head, about ball 60, to bring the line of sight A—A in the direction toward the energizing loop. This is done by bringing the cross-hairs in the two sighting devices 50 into alignment with the center of the energizing loop. Handle 65 is then tightened to clamp the head in this position. Mark 69 is then brought to vertical position by means of adjusting knob 77, this position being ascertained by the level bubble device 73.

The receiving circuit is then turned on, and coil 2 is swung about shaft 47, the position of the coil for minimum current reception being determined by means of the head-phones 92 or other current indicating means. The angular direction of the coil, or a direction perpendicular thereto, is then read on scale 67.

If the apparatus shown in Figs. 10 to 13 inclusive is used, the entire head is first leveled in the same manner as a surveyor's transit. With the coil in some such position as shown in Fig. 12, so as to permit sighting through telescope 103, the telescope is sighted upon the center of the energizing loop. Horizontal angular movement thereof is permitted by loosening base 123 and vertical angular movement by loosening set screw 124 to permit rotation of shaft 121. Said base and shaft are then clamped in this position, and if desired the horizontal angular direction of the telescope or line of sight, with respect to any desired direction, may be read from scale 125, while the vertical angular direction thereof may be read from scale 126.

For rotation about an axis parallel to the line of sight toward the energizing loop, the coil 2 is first rotated about shaft 101 to the position shown in Fig. 13, the catch member 104 engaging in one of the recesses 106 to hold the same in this position. Set screw 111 is then loosened and the coil rotated about shaft 112 to find the position of minimum signal reception. The "dip" is then read from scale 108.

Using either of the above described forms of direction-finding apparatus, a set of "dip" readings may, therefore, be obtained at points distributed over the entire area under investigation. It is true that during this first survey the position and direction of the energizing loop is arbitrarily selected so that its relation to the axis of the conductor is undetermined and the lines of force of the primary field do not in general cut the axis of the conductor squarely. For this reason the results obtained in this survey are somewhat inaccurate, but it is possible to obtain in this manner "dip" readings which give at least approximate indications as to the plan view location of conductive bodies. The positions at which vertical "dips" are obtained, accompanied by converging "dips" at points at either side thereof, indicate that the axis of a conductive body lies approximately beneath these points and the horizontal projections or plan view locations of such axes may, therefore, be calculated and plotted.

I then proceed to make a final or detailed survey, based on the approximate knowledge, thus obtained. In making this final survey the energizing loop is in each case set up at a position directly or substantially over the position of the axis of a conductive body, as indicated in the first survey. At suitable intervals along the direction of said axis, a series of traverse surveys are made. At each traverse the direction-finding coil is set up at a plurality of spaced points extending to a considerable distance to either side of the indicated approximate location of the conductor, and "dip" readings are again taken. In this final survey, as in the reconnaissance survey, the energizing loop is maintained in a vertical plane directed toward the direction-finding coil and the direction-finding coil is rotated about an axis extending in the true direction toward the center of the energizing loop. This is to be distinguished from previous methods, in which the "dip" readings made during the final survey were obtained about an axis which was not only horizontal but which was parallel to the indicated plan view location of the conductor.

Upon each of these traverses a set of "dip" readings, such as shown at $D_1$ to $D_7$ inclusive in Fig. 18, is obtained, and these "dip" readings may be plotted as shown in said figure to indicate the location of the axis of the conductive body, or such location may, if desired, be determined by mathematical calculations. From the plotting of the results, the vertical "dip" $D_4$ indicates the location of the horizontal projection of the axis at the position of this traverse. If the other "dips" are then projected to intersect the vertical line $D_4$—M as indicated at $N_1$ to $N_7$ inclusive, and horizontal lines are drawn through these points of intersection, so as to intersect the verticals from the successive points $D_1$ to $D_7$ at points $P_1$ to $P_7$ respectively, two curves Q may be drawn through said last-named points and the point at which said curves intersect the vertical $D_4$—M gives an approximate indication of the depth of the axis $O_x$ beneath the point $D_4$. For certain reasons, as explained in article on "Fundamental factors underlying electrical methods of geophysical prospecting," by J. J. Jakosky, in Engineering and Mining Journal, Feb. 11 and 18, 1928, the indications obtained by this method of plotting are not strictly accurate, but under the conditions usually encountered, the results are sufficiently accurate for practical purposes. It should be noted, however, that for the reason above mentioned the indications plotted in Fig. 18 are not upon a vertical plane, but upon a plane perpendicular to the direction toward the energizing loop, whose intercept is indicated at DE in Fig. 16, and the indicated depth $D_4$—$O_x$ is, therefore, taken along the line DE. This indicated depth may be plotted in a vertical plane extending longitudinally of the conductor, in the manner shown in Fig. 19, to locate a point $Z_1$ upon the axis of the conductor. If similar sets of "dip" readings are made at traverses at different distances from the energizing loop, the depths of the axis of the conductor below the points of vertical "dip" on these traverses, such as D' and D'', may be similarly determined and plotted, giving additional points Z' and Z'' and a line may then be drawn through the points Z, Z' and Z'' to give a vertical projection of the axis of the conductive body.

In some cases, particularly during the first or reconnaissance survey, useful indications may also be obtained by rotating the direction-finding coil about an axis extending in the direction of the line D E in Fig. 16, that is, perpendicular to the direction from the coil toward the energizing loop and lying in the same vertical plane. For this purpose the direction-finding apparatus shown in Figs. 10 to 13 is particularly adapted, as the coil 2 may simply be swung to the position indicated in Fig. 12, in which position the catch member 104 engages in the other recess 106, and then loosening set screw 119 and rotating the coil about shaft 114. The coil may be so rotated until the position of minimum signal reception is determined, and the angular departure of the plane of the coil at the time of such minimum signal reception from the plane perpendicular to the direction toward the engineering loop may be read from scale 117. The type of indication obtained in manner is illustrated in Fig. 20, the direction toward the energizing loop being as indicated. The direction of the lines of magnetic force of the energizing field at the position of the coil located at point D will be as indicated at $F_1$, while the lines of magnetic force of the secondary field whose axis is at $O_x$ will extend in the direction indicated at $F_2$. The position of minimum signal reception in coil 2 will, therefore, depart from the plane perpendicular to the direction toward the energizing loop, by the angle $\Delta$, indicating the apparent direction of the resultant electromagnetic field as at F. The indications obtained in this manner are mainly of value in indicating the presence and general direction of a conductive body rather than the exact location thereof.

I claim:

1. The method of locating conductive bodies within a mass of less conductive material which comprises energizing such a conductive body by means of an electromagnetic field transmitted from an energizing loop, and then, by means of a direction-finding coil, detecting the presence and measuring the effect of the secondary electromagnetic field resulting from the induced current in said conductive body, at a plurality of points adjacent said energizing loop, the direction-finding coil being rotated, for the purpose of making such measurements, about an axis substantially parallel to the direction from said coil to the energizing loop.

2. The method of locating underground conductive bodies in a region of uneven topography, which comprises setting up an energizing electromagnetic field about a transmitting loop at a point in said region so as to cause an induced current to flow in a conductive body within said field, operating a direction-finding coil at a plurality of points within said region and at different elevations from that of said transmitting loop, the operation of said direction-finding coil at each of said points comprising rotating said coil about an axis parallel to the direction from said coil to the transmitting loop and determining, by observation of the resulting variation in intensity of signal reception, the direction of the resultant electromagnetic field.

3. The method as set forth in claim 2, the operation of said direction-finding coil comprising in addition rotating said coil about an axis perpendicular to said first-named axis and lying in a vertical plane, and observing the resulting variation in intensity of signal reception thereby.

4. In electromagnetic methods of locating underground conductive bodies, in which current flow is induced in such conductive bodies by means of a primary field set up by an air energizing loop, the method of obtaining indications as to the presence and direction of secondary electromagnetic fields surrounding said conductive bodies which comprises rotating a direction-finding coil, at a plurality of points spaced from the energizing loop and at varying elevations, about an axis which at each such point lies substantially in the true direction from the direction-finding coil toward the energizing loop, and observing in each case the resulting variation in intensity of reception upon such rotation of the direction-finding coil.

5. The method as set forth in claim 4, and comprising in addition rotating the direction-finding coil, at a plurality of such points, about another axis perpendicular to the first-named axis of rotation and lying in a vertical plane, and observing the resulting variation in intensity of reception thereby.

6. An energizing apparatus for use in electromagnetic induction methods of locating unknown conductive bodies comprising a ring-shaped housing of insulated material mounted upon a tripod for universal adjustment thereon, said housing having an enlarged portion at the bottom, a transmitting loop wound within said ring-shaped housing, and oscillating circuit means located within said enlarged portion and connected to said loop, said housing completely enclosing the turns of said loop and the enlarged portion thereof completely enclosing said oscillating circuit means.

7. A direction-finding apparatus for use in electromagnetic induction methods of locating underground conductive bodies comprising a supporting base, a supporting head mounted on said base so as to permit universal adjustment thereof, means for clamping said supporting head in any position to which it may be adjusted, a wire coil mounted on said supporting head so as to permit rotation thereof about either of two perpendicular axes and to permit the coil to be moved to position to bring either of said axes into the plane thereof, means cooperating with said coil for the reception of electromagnetic impulses, and means for measuring the angular position of said coil, with reference to known planes, about either of said axes.

8. An apparatus as set forth in claim 7 and comprising in addition means defining a line of sight parallel to one of said axes.

In testimony whereof I have hereunto subscribed my name this 5th day of June, 1928.

JOHN J. JAKOSKY.